United States Patent
Lin et al.

(10) Patent No.: US 10,656,321 B1
(45) Date of Patent: May 19, 2020

(54) LIGHT GUIDING STRUCTURE OF BACKLIGHT DEVICE

(71) Applicant: SUZHOU LUUMII LTD., Suzhou, Jiangsu Province (CN)

(72) Inventors: Yu-Kai Lin, Suzhou (TW); Chen-Fang Kang, Suzhou (CN)

(73) Assignee: SUZHOU LUUMII LTD., Suzhou, Jiangsu Province (CN)

( * ) Notice: Subject to any disclaimer, the term of this patent is extended or adjusted under 35 U.S.C. 154(b) by 0 days.

(21) Appl. No.: 16/449,340

(22) Filed: Jun. 22, 2019

(30) Foreign Application Priority Data

Mar. 27, 2019 (TW) .............................. 108203758 U

(51) Int. Cl.
*F21V 7/04* (2006.01)
*F21V 8/00* (2006.01)
*G02B 6/42* (2006.01)

(52) U.S. Cl.
CPC ......... *G02B 6/0031* (2013.01); *G02B 6/0073* (2013.01); *G02B 6/0076* (2013.01); *G02B 6/4283* (2013.01)

(58) Field of Classification Search
CPC ........ G02B 6/0031; G02B 6/0073–008; G02B 6/4283

USPC ................................ 362/609, 612, 621–624
See application file for complete search history.

(56) References Cited

U.S. PATENT DOCUMENTS

2008/0175022 A1* 7/2008 Sugiura ............... G02B 6/0031
362/609

* cited by examiner

*Primary Examiner* — Jason M Han
(74) *Attorney, Agent, or Firm* — Chun-Ming Shih; HDLS IPR Services

(57) ABSTRACT

A light guiding structure of a backlight device having an insulation substrate, a micro LED, a reflecting layer, a light guiding layer and reflecting film. An illuminating surface is formed on the insulation substrate. The reflecting layer is stacked on the insulation substrate and stacked with the light guiding layer. The micro LED is arranged on the illuminating surface and illuminating toward a direction perpendicular to the illuminating surface. The reflecting film is stacked on the illuminating surface and covering on the micro LED, an edge of the light guiding layer is stacked between an edge of the reflecting film and the reflecting layer, a reflecting slope is defined on the reflecting film and extended from the micro LED to the edge of the light guiding layer. Light projected from the micro LED is reflected into the light guiding layer by the reflecting slope of the reflecting film.

12 Claims, 2 Drawing Sheets

LIGHT GUIDING STRUCTURE OF BACKLIGHT DEVICE

TECHNICAL FIELD

The present disclosure is related to a backlight device, and in particular to a light guiding structure of a backlight device for a slim illuminating keyboard.

BACKGROUND

A backlight device arranged in a conventional keyboard is usually for a dim environment or special use requirements (such as appearance). An illuminating keyboard is provided with light-emitting diodes at respective specific positions below the respective keys so that the keys can be penetrated by light. A common solution for uniformizing the light source is to disposing the light emitting diodes at a side of a light guiding sheet, and light is project into the light guiding sheet from the light emitting diode emits and diffused in the light guiding sheet.

The aforementioned configuration generally has a substrate, light emitting diodes (LEDs) are disposed on one side of a top surface of the substrate, control circuits electrically connected to the light emitting diodes are disposed on the top surface of the substrate, and a light guiding sheet is further disposed on the top surface of the substrate. Edge light LEDs are used in the aforementioned configuration, and the edge light LEDs illuminate long a direction parallel with the substrate and therefore can directly project light into the light guiding sheet. However, it is limited by current technologies, a thickness of the edge light LED is larger than even times of a thickness of a conventional direct light LED (the direct light LED projects light along a direction perpendicular to the substrate). Therefore, a total thickness of the aforementioned structure is limited by the thickness of the edge light LED and therefore difficult to be reduced. A conventional mobile device lacks of thickness space. If the thickness of the keyboard cannot be reduced, large electronic components are therefore forced to be gathered and disposed outside of the keyboard. However, the most areas in the mobile device are occupied by the keyboard, and an arrangement of the electronic components in the mobile device is seriously limited by space in the mobile device.

In views of this, in order to solve the above disadvantage, the present inventor studied related technology and provided a reasonable and effective solution in the present disclosure.

SUMMARY

A light guiding structure for a backlight device of a slim illuminating keyboard is provided in the present disclosure.

A light guiding structure of a backlight device having an insulation substrate, a micro LED, a reflecting layer, a light guiding layer and reflecting film is provided in the present disclosure. An illuminating surface is formed on a surface of the insulation substrate. The reflecting layer is stacked on the insulation substrate. The light guiding layer is stacked with the reflecting layer. The micro LED is arranged on the illuminating surface and illuminating toward a direction perpendicular to the illuminating surface. The reflecting film is stacked on the illuminating surface of the insulation substrate and covering on the micro LED, an edge of the light guiding layer is stacked between an edge of the reflecting film and the reflecting layer, a reflecting slope is defined on the reflecting film, and the reflecting slope is extended from the micro LED to the edge of the light guiding layer.

According to the light guiding structure of the backlight device, a conductive structure is arranged on the illuminating surface and the conductive structure is electrically connected to the micro LED. A protect layer covers on the illuminating surface, and the protect layer covers the micro LED and the conductive structure on the illuminating surface.

According to the light guiding structure of the backlight device, a protect layer covers on the illuminating surface, a fluorescent layer covers on the micro LED.

According to the light guiding structure of the backlight device, the edge of the reflecting film is overlapped with the edge of the light guiding layer. The light guiding layer is stacked between the reflecting film and the reflecting layer.

According to the light guiding structure of the backlight device, a thickness from the illuminating surface at a portion of the reflecting film overlapping with the light guiding layer is larger than a thickness from the illuminating surface at a portion of the reflecting film covering on the micro LED. The reflecting slope is a concave surface.

According to the light guiding structure of the backlight device, the insulation substrate is separated from the reflecting slope of the reflecting film and a hollow area is thereby defined between the insulation substrate and the reflecting film.

According to the light guiding structure of the backlight device, reflecting layer the reflecting layer covers on the illuminating surface of the insulation substrate or the other surface of the insulation substrate opposite to the illuminating surface.

According to the light guiding structure of the backlight device, light projected from the micro LED is reflected into the light guiding layer by the reflecting slope of the reflecting film, and the structure is therefore suitable for a small direct light micro LED. Accordingly, a thickness of the light guiding structure of the backlight device could be reduced.

BRIEF DESCRIPTION OF DRAWINGS

The present disclosure can be more fully understood by reading the following detailed description of the embodiment, with reference made to the accompanying drawings as follows.

DETAILED DESCRIPTION

Figure 1:
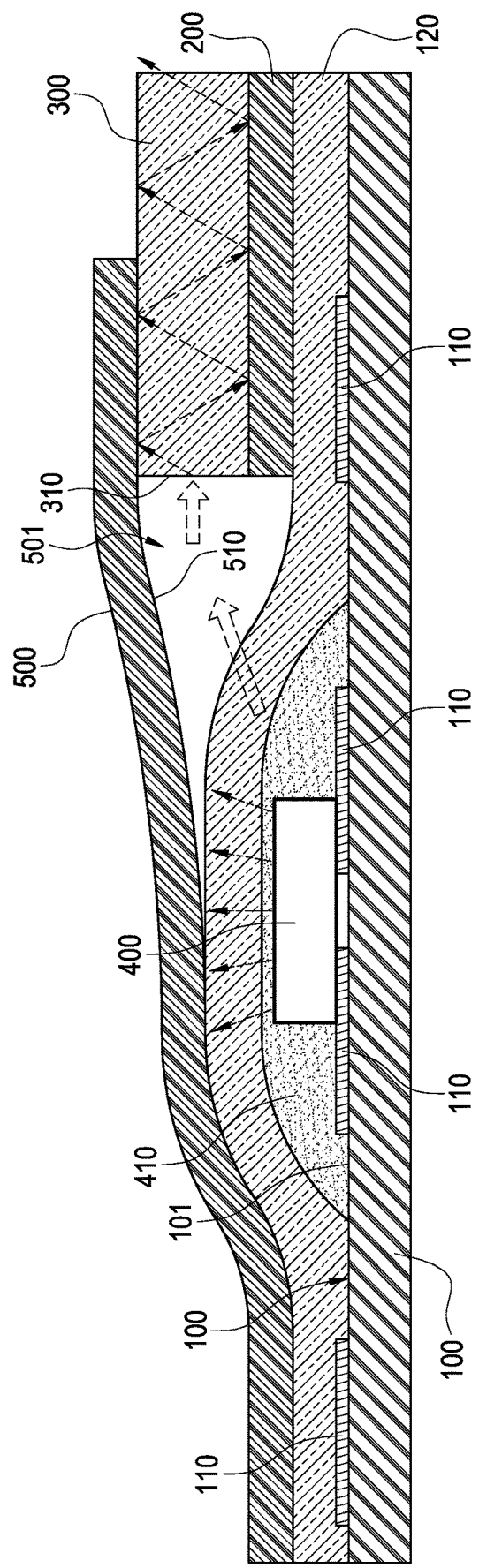
FIG. 1 is a schematic view showing the light guiding structure of the backlight device according to a first embodiment of the present disclosure.

According to FIG. 1, a light guiding structure of a backlight device having an insulation substrate 100, a reflecting layer 200, a light guiding layer 300, a micro LED 400 and a reflecting film 500 is provided in an embodiment of the present disclosure.

The insulation substrate 100 is preferably made of PET (polyethylene terephthalate), an illuminating surface 101 is defined on a surface of the insulation substrate 100. A conductive structure 110 is arranged on the illuminating surface 101 of the insulation substrate 100, and the conductive structure 110 is electrically connected with the micro LED 400. According to the present embodiment, the conductive structure 110 preferably has silver leads printed on the illuminating surface 101.

The reflecting layer 200 is stacked on the illuminating surface 101 of the insulation substrate 100, and the reflecting layer 200 is an opaque sheet. The light guiding layer 300 is stacked on the reflecting layer 200 and stacked with the reflecting layer 200. The light guiding layer 300 is a transparent sheet, and the light guiding layer 300 is preferably arranged within a border of the reflecting layer 200. A cross section 310 is formed on an edge of the light guiding layer 300, and the cross section 310 is extended along a thick direction of the light guiding layer 300.

The micro LED 400 (micro light-emitting diode) is arranged on the illuminating surface 101, and the micro LED 400 illuminates along a direction perpendicular to the illuminating surface 101. The micro LED 400 could be any colors and a fluorescent layer 410 could be provided to cover on the micro LED 400 for specific color requirement. If the micro LED 400 is covered by the fluorescent layer 410, the fluorescent layer 410 could change the light projected from the micro LED 400 to a required specific color. A light-emitting unit micro-grain of the micro LED 400 is smaller than 300 micrometers and is ⅟30 to ⅟10 of a traditional LED in size. The micro LED 400 is preferably arranged out of respective borders of the reflecting layer 200 and the light guiding layer 300. According to the present embodiment, the micro LED 400 is preferably arranged adjacent a side of the light guiding layer 300 corresponding to the cross section 310 of the light guiding layer 300.

The reflecting film 500 is a flexible opaque sheet, an edge of the light guiding layer 300 is stacked between the reflecting layer 200 and an edge of the reflecting film 500. Preferably, the reflecting film 500 is stacked on the illuminating surface 101 of the insulation substrate 100 and covers on the micro LED 400. The edge of the reflecting film 500 is overlapped with a side of the edge of the light guiding layer 300 and the edge of the reflecting film 500 is thereby fixed, and this portion of the edge of the light guiding layer 300 is stacked between the reflecting film 500 and reflecting layer 200. A thickness from the illuminating surface 101 of the portion of the edge of the reflecting film 500 overlapped with the light guiding layer 300 is larger than a thickness from the illuminating surface 101 of a portion of the reflecting film 500 covering the micro LED 400. A reflecting slope 510 is formed on the reflecting film 500 by the thickness difference, and the reflecting slope 510 is obliquely extended from the micro LED 400 to the edge of light guiding layer 300 and arranged toward the cross section 310 of the light guiding layer 300. The reflecting slope 510 is preferably a concave surface and therefore able to not only reflect light but also converge light projected from the micro LED 400.

The insulation substrate 100 is separated from the reflecting slope 510 of the reflecting film 500 and a hollow area 501 is thereby defined therebetween. Light is upward projected from the micro LED 400 through the hollow area 501 and into the light guiding layer 300 via the cross section 310 of the light guiding layer 300. The edge of the reflecting film 500 is overlapped with the edge of the light guiding layer 300 and a top of the cross section 310 is thereby closed by the reflecting film 500. Thereby, the reflected light could be completely transferred into the light guiding layer 300 through the cross section 310 of the light guiding layer 300. Moreover, the light projected through the light guiding layer 300 is reflected by the reflecting layer 200 to from a surface light source and projected from the light guiding layer 300. However, the light could alternatively be upward projected from the micro LED 400 through the hollow area 501 and into the light guiding layer 300 through a normal surface at a side of the light guiding layer 300.

A protect layer 120 covers on the illuminating surface 101 of the insulation substrate 100 to protect the electronic elements arranged on the illuminating surface 101. The electronic elements refer to the aforementioned micro LED 400 and conductive structure 110 arranged on the illuminating surface 101. Accordingly, the protect layer 120 preferably covers on the micro LED 400 and the conductive structure 110.

According to the light guiding structure of the backlight device of the present disclosure, light projected from the micro LED 400 is reflected into the light guiding layer 300 by the reflecting slope 510 of the reflecting film 500. Therefore, the light guiding structure is suitable for small direct light micro LED 400, and a thickness of the whole backlight device could be thereby reduced.

Figure 2:
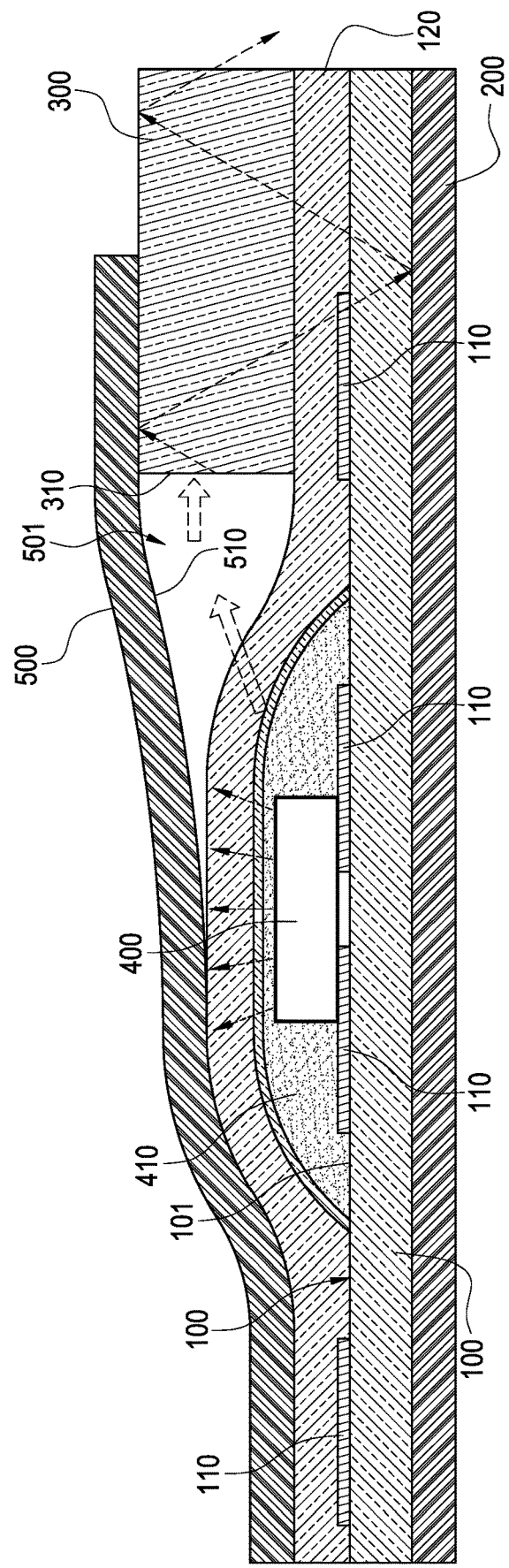
FIG. 2 is a schematic view showing the light guiding structure of the backlight device according to a second embodiment of the present disclosure.

According to FIG. 2, a light guiding structure of the backlight device having an insulation substrate 100, a reflecting layer 200, a light guiding layer 300, a micro LED 400 and a reflecting film 500 is provided in an embodiment of the present disclosure. The respective elements of the present embodiment are the same as the aforementioned embodiment, and the difference between the embodiments are described below.

The insulation substrate 100 is preferably made of PET and light transmissive), an illuminating surface 101 is defined on a surface of the insulation substrate 100. A conductive structure 110 is arranged on the illuminating surface 101 of the insulation substrate 100, and the conductive structure 110 is electrically connected with the micro LED 400. According to the present embodiment, the conductive structure 110 preferably has silver leads printed on the illuminating surface 101.

An edge of the light guiding layer 300 is stacked between the reflecting layer 200 and an edge of the reflecting film 500. According to the present embodiment the insulation substrate 100 and the light guiding layer 300 are preferably stacked between the reflecting film 500 and the reflecting layer 200, and the reflecting layer is stacked on the other surface of the insulation substrate 100 opposite to the illuminating surface 101. The reflecting layer 200 is an opaque sheet. The light guiding layer 300 is stacked on the reflecting layer 200 and stacked with the reflecting layer 200. The light guiding layer 300 is a transparent sheet, and the light guiding layer 300 is preferably arranged within a border of the reflecting layer 200. A cross section 310 is formed on an edge of the light guiding layer 300, and the cross section 310 is extended along a thick direction of the light guiding layer 300.

The micro LED 400 is preferably arranged adjacent a side of the light guiding layer 300 corresponding to the cross section 310 of the light guiding layer 300.

The insulation substrate 100 is separated from the reflecting slope 510 of the reflecting film 500 and a hollow area 501 is thereby defined therebetween. Light is upward projected from the micro LED 400 through the hollow area 501 and into the light guiding layer 300 via the cross section 310 of the light guiding layer 300. The edge of the reflecting film 500 is overlapped with the edge of the light guiding layer 300 and a top of the cross section 310 is thereby closed by the reflecting film 500. Thereby, the reflected light could be completely transferred into the light guiding layer 300 through the cross section 310 of the light guiding layer 300. Moreover, the light projected through the light guiding layer 300 is reflected by the reflecting layer 200 to from a surface light source and projected from the light guiding layer 300. However, the light could alternatively be upward projected from the micro LED 400 through the hollow area 501 and into the light guiding layer 300 through a normal surface at a side of the light guiding layer 300.

Although the present disclosure has been described with reference to the foregoing preferred embodiment, it will be understood that the disclosure is not limited to the details thereof. Various equivalent variations and modifications can still occur to those skilled in this art in view of the teachings of the present disclosure. Thus, all such variations and equivalent modifications are also embraced within the scope of the present disclosure as defined in the appended claims.

What is claimed is:

1. A light guiding structure of a backlight device, comprising:
    an insulation substrate, an illuminating surface being defined on a surface of the insulation substrate;
    a reflecting layer, stacked on the insulation substrate;
    a light guiding layer, stacked with the reflecting layer;
    a micro LED, arranged on the illuminating surface and illuminating toward a direction perpendicular to the illuminating surface; and
    a reflecting film, stacked on the illuminating surface of the insulation substrate and covering on the micro LED, an edge of the light guiding layer being stacked between an edge of the reflecting film and the reflecting layer, a reflecting slope being defined on the reflecting film, and the reflecting slope being extended from the micro LED to the edge of the light guiding layer.

2. The light guiding structure of the backlight device according to claim 1, wherein a conductive structure is arranged on the illuminating surface and the conductive structure is electrically connected to the micro LED.

3. The light guiding structure of the backlight device according to claim 2, wherein a protect layer covers on the illuminating surface, and the protect layer covers the micro LED and the conductive structure on the illuminating surface.

4. The light guiding structure of the backlight device according to claim 1, wherein a protect layer covers on the illuminating surface.

5. The light guiding structure of the backlight device according to claim 1, wherein a fluorescent layer covers on the micro LED.

6. The light guiding structure of the backlight device according to claim 1, wherein the edge of the reflecting film is overlapped with the edge of the light guiding layer.

7. The light guiding structure of the backlight device according to claim 6, wherein the light guiding layer is stacked between the reflecting film and the reflecting layer.

8. The light guiding structure of the backlight device according to claim 1, wherein a thickness from the illuminating surface at a portion of the reflecting film overlapping with the light guiding layer is larger than a thickness from the illuminating surface at a portion of the reflecting film covering on the micro LED.

9. The light guiding structure of the backlight device according to claim 8, wherein the reflecting slope is a concave surface.

10. The light guiding structure of the backlight device according to claim 1, wherein the insulation substrate is separated from the reflecting slope of the reflecting film and a hollow area is thereby defined between the insulation substrate and the reflecting film.

11. The light guiding structure of the backlight device according to claim 1, wherein the reflecting layer covers on the illuminating surface of the insulation substrate.

12. The light guiding structure of the backlight device according to claim 1, wherein the reflecting layer covers on the other surface of the insulation substrate opposite to the illuminating surface.

* * * * *